E. C. BACON.

Lightning-Rod Coupling.

No. 9,145. Reissued April 13, 1880.

Witnesses

H. J. Thompson

A. L. Champion.

Inventor.

E. C. Bacon per W. H. Bunnage Atty.

UNITED STATES PATENT OFFICE.

ELMORE C. BACON, OF CLEVELAND, OHIO.

LIGHTNING-ROD COUPLING.

SPECIFICATION forming part of Reissued Letters Patent No. 9,145, dated April 13, 1880.

Original No. 214,545, dated April 22, 1879. Application for reissue filed March 16, 1880.

*To all whom it may concern:*

Be it known that I, ELMORE C. BACON, of Cleveland, in the county of Cuyahoga and State of Ohio, have invented certain new and useful Improvements in Lightning-Rods; and I do hereby declare that the following is a full, clear, and complete description thereof, reference being had to the accompanying drawings, making part of the same.

The nature of my improvement in lightning-rods relates to the means employed for coupling and securing the sections of rods together and strengthening the same.

My improvement is applied to that class of rods known as "tubular rods;" and it consists in making one end of a section into a tenon tapering from its shoulder or junction with the main body along a portion of said tenon and of a uniform diameter the remainder thereof, which tenon forms an integral part of the section with which it is connected. The other connecting-section of the rod is shaped in its interior or bore to receive the said tenon. When thus connected together a pin or rivet is passed through the joint to secure the sections together.

Figure 1:
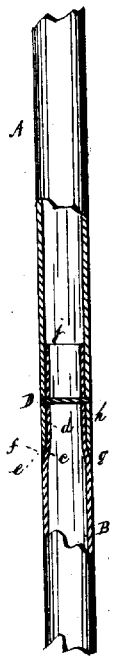
Figure 2:
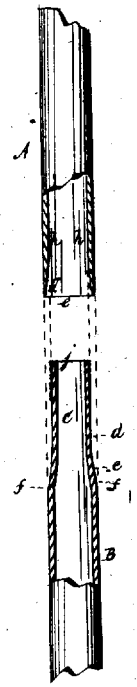

Figure 1 is a view of the rod and joint in section. Fig. 2 is a view of the joint and sections detached.

Like letters of reference refer to like parts in the several views.

I am aware that tubular lightning-rods have been connected together by means of a dowel or pin inserted in both ends of the tube, and that tubular sections have been coupled by means of a sleeve or thimble screwed or otherwise secured to the exterior or interior ends of the tubes. Therefore I do not claim such devices; but what distinguishes my improvement is the tenon made parallel or of a uniform diameter along a portion of its length, the remainder tapering, with the swell of the taper, terminating in a curved shoulder or with the body of the rod at its junction, all in one piece of metal, in combination with the female section, shaped to fit the said tenon, making a strong and secure coupling at the same time, the joint having the same external diameter and even surface with the sections of the rod.

The tapering section of the tenon prevents the joint from becoming loose and shackling, as in the ordinary mode of coupling, and the conical or tapering part being interposed between the end of the tenon and body of the rod, with largest diameter of the swell in junction with the shoulder or body of the rod, secures additional strength to that part of the joint. The weak part of a tubular rod as usually constructed is at the jointed connection of the sections; but by tapering a section of the tenon and making the swell terminate in a shoulder or body of the rod, all in one piece, a firm and durable coupling is the result when connected with the adjoining section.

In the construction of the tenon no sharp angles are presented which tend to crack and rupture the metal; hence they are not liable to break when subjected to the strain of erection and use.

In Fig. 1 A and B represent two sections of tubular lightning-rod. From section B extends a tenon, C, forming one end thereof. The tenon from *a* to *c* is tapering, the swell terminating in the rod or curved shoulder *f*. Section A is also tapering from *g* to *h* in the interior, as seen in Fig. 2, which taper is shaped to correspond with the conical swell on the tenon. The end *e* of section A is shaped to fit the shoulder or body of the rod.

That part of the tenon from *d* to *j*, extending beyond the taper, may be parallel to fit the interior of the connecting-tube, and when the two sections are shaped and coupled together as described, a pin or rivet, D, is passed through the coupled ends of the sections and is riveted, making a smooth and even surface the entire length of the rod.

What I claim as my invention, and desire to secure by Letters Patent, is—

1. In joints for tubular lightning-rods, the tenon formed parallel along a portion of the length and tapering the other part thereof, with a shoulder in junction with the swell of the taper and body of the section, all in one piece, substantially as and for the purpose specified.

2. In tubular lightning-rods, an improvement consisting in one end of section B formed with a tenon tapering along a portion of its length and parallel with the other, with a shoulder at the junction of said body of the rod, all in one piece of metal, in combination with the section A, shaped to fit said tenon, and with one or more rivets, to form a coupling-joint, substantially in the manner as described.

3. In coupling-joints for tubular lightning-rods, the tenon thereof made uniform in diameter along its outer portion, with a conical swell extending therefrom and terminating in the shoulder or body of the rod, all in one piece of metal, in combination with section A, having its interior surface formed to fit said tenon, constructed and arranged substantially as set forth.

ELMORE C. BACON.

Witnesses:

WM. M. DILLHOEFER,

J. H. BURRIDGE.